(12) United States Patent
Sluka (10) Patent No.: US 12,487,458 B2
(45) Date of Patent: Dec. 2, 2025

(54) NEAR-EYE IMAGE PROJECTION SYSTEM HAVING FOVEATED PROJECTION AND EXPANDED EYE-BOX REGION

(71) Applicant: CREAL SA, Ecublens VD (CH)

(72) Inventor: Tomas Sluka, Lausanne (CH)

(73) Assignee: Creal SA, Ecublens VD (CH)

( * ) Notice: Subject to any disclaimer, the term of this patent is extended or adjusted under 35 U.S.C. 154(b) by 477 days.

(21) Appl. No.: 17/915,041

(22) PCT Filed: Apr. 14, 2020

(86) PCT No.: PCT/IB2020/053484
§ 371 (c)(1),
(2) Date: Sep. 27, 2022

(87) PCT Pub. No.: WO2021/209785
PCT Pub. Date: Oct. 21, 2021

(65) Prior Publication Data
US 2023/0168511 A1 Jun. 1, 2023

(51) Int. Cl.
*G02B 27/01* (2006.01)
*G02B 27/00* (2006.01)
*G02B 27/09* (2006.01)

(52) U.S. Cl.
CPC ..... *G02B 27/0172* (2013.01); *G02B 27/0081* (2013.01); *G02B 27/0093* (2013.01);
(Continued)

(58) Field of Classification Search
CPC ............ G02B 27/0172; G02B 27/0081; G02B 27/0093; G02B 27/0179; G02B 27/0944;
(Continued)

(56) References Cited

U.S. PATENT DOCUMENTS

| 5,734,359 A | 3/1998 | Van Hooreweder |
| 8,189,263 B1 | 5/2012 | Wang et al. |

(Continued)

FOREIGN PATENT DOCUMENTS

| CN | 108474939 A | 8/2018 |
| JP | H-07311361 A | 11/1995 |

(Continued)

OTHER PUBLICATIONS

International Search Report and Written Opinion for PCT/IB2020/053484 dated Jan. 12, 2021, 10 pages.
(Continued)

*Primary Examiner* — William R Alexander
*Assistant Examiner* — Matthew Y Lee
(74) *Attorney, Agent, or Firm* — Blank Rome LLP (57) ABSTRACT

A near-eye image projection system, comprising a pin-light array generating incident light beams illuminating an optical light modulator configured for modulating the incident light beams and projecting modulated light-beams; an optical element configured to project the modulated light beams such as to form pin-light images and project projected image light beams defining an eye-box region along a projection axis. The modulated light beams comprise foveal modulated light beams forming foveal pupil images and projecting foveal projected image light beams defining a foveal eye-box region, and peripheral modulated light beams forming peripheral pupil images. An exit pupil expansion device is configured to project pupil expanded light beams for each of the peripheral pin-light images and to form peripheral projected image light beams defining a peripheral eye-box region wider than the foveal eye-box region.

19 Claims, 7 Drawing Sheets

(52) U.S. Cl.
CPC ..... G02B 27/0179 (2013.01); G02B 27/0944 (2013.01); *G02B 2027/0123* (2013.01); *G02B 2027/0138* (2013.01); *G02B 2027/0147* (2013.01); *G02B 2027/0187* (2013.01)

(58) Field of Classification Search
CPC .... G02B 2027/0123; G02B 2027/0138; G02B 2027/0147; G02B 2027/0187; G02B 2027/0174
See application file for complete search history.

(56) References Cited

U.S. PATENT DOCUMENTS

| | | | |
|---|---|---|---|
| 11,448,803 B1* | 9/2022 | Lu | G02B 5/0278 |
| 2017/0285344 A1* | 10/2017 | Benko | G06T 19/006 |
| 2018/0367769 A1* | 12/2018 | Greenberg | G02B 27/0172 |
| 2019/0285897 A1* | 9/2019 | Topliss | G02B 27/0172 |
| 2019/0310543 A1 | 10/2019 | Komatsu et al. | |
| 2020/0049995 A1* | 2/2020 | Urey | G02B 27/0179 |
| 2021/0191123 A1* | 6/2021 | Leister | H04N 13/339 |
| 2021/0405378 A1* | 12/2021 | Choi | G02F 1/137 |
| 2022/0206301 A1* | 6/2022 | Curtis | G02B 27/0081 |
| 2023/0044063 A1* | 2/2023 | Peng | G09G 3/2011 |

FOREIGN PATENT DOCUMENTS

| | | |
|---|---|---|
| JP | H-11326816 A | 11/1999 |
| JP | 2004/145367 A | 5/2004 |
| JP | 2016/517036 A | 6/2016 |
| JP | 2018/205418 A | 12/2018 |
| JP | 2019/113794 A | 7/2019 |
| JP | 2019/184752 A | 10/2019 |
| WO | WO-2010/062481 A1 | 6/2010 |
| WO | WO-2018/057660 A2 | 3/2018 |
| WO | WO-2018/091984 A1 | 5/2018 |

OTHER PUBLICATIONS

R. Xiao, et al., "Augmenting the Field-of-View of Head-Mounted Displays with Sparse Peripheral Displays", Human Factors in Computing Systems, May 7, 2016, pp. 1221-1232, 12 pages.

* cited by examiner

NEAR-EYE IMAGE PROJECTION SYSTEM HAVING FOVEATED PROJECTION AND EXPANDED EYE-BOX REGION

RELATED APPLICATIONS

This application is a national phase of PCT/IB2020/053484, filed on Apr. 14, 2020. The entire contents of this application is hereby incorporated by reference.

TECHNICAL DOMAIN

The present disclosure relates to a near-to-eye image projection, more specifically to a near-to-eye image projection for virtual, augmented, mixed, or extended reality head worn devices and related applications.

RELATED ART

A pin-light based near-to-eye sequential light-field projector is described in patent application WO2018091984A1 by the present applicant. The described light-field projector projects light-fields into an eye-box defined by the size of the array of projected viewpoints at the exit pupil. The exit pupil is for many use cases small. At the same time, the angular resolution of the projected image is traded off with the field-of-view (FoV) of the projected image.

SUMMARY

The present disclosure concerns a near-eye image projection system, comprising a pin-light array generating a plurality of incident light beams illuminating an optical light modulator configured for modulating the incident light beams and projecting a plurality of modulated light-beams; an optical element configured to project the plurality of modulated light beams such as to form pin-light images at a first pin-light plane and project a plurality of projected image light beams defining an eye-box region along a projection axis; wherein said plurality of modulated light beams comprises a plurality of foveal modulated light beams forming foveal pupil images and projecting a plurality of foveal projected image light beams defining a foveal eye-box region. The plurality of modulated light beams further comprises a plurality of peripheral modulated light beams forming peripheral pupil images. The system further comprising an exit pupil expansion device configured to project a plurality of pupil expanded light beams for each of the peripheral pin-light images, said plurality of pupil expanded light-fields forming peripheral projected image light beams defining a peripheral eye-box region wider than the foveal eye-box region.

In the image projection system disclosed herein, the foveal projected image light beams contribute to the formation of a light-field image in a narrow central part of FoV. The peripheral modulated light beams are modulated by an image information that corresponds to the peripheral parts of the total FoV and are projected through the exit pupil expanding element.

The image projection system has increased effective FoV and increased perceived image resolution. The latter are achieved by combining high resolution light-field in a narrow FoV and limited eye-box, with a non-light-field image covering peripheral parts of larger total FoV and passing through a larger eye-box.

The image projection system can comprise an eye-tracking and steering device configured to provide eye-tracking information about where a viewer is looking. The eye-tracking and steering device can be configured to deflect the peripheral projected image light beams and the light-field image in accordance to eye-tracking information.

SHORT DESCRIPTION OF THE DRAWINGS

Exemplar embodiments of the invention are disclosed in the description and illustrated by the drawings in which:

FIG. 5 illustrates the image projection system comprising an eye-tracking and steering device without pupil expansion element (FIG. 5a) for basic illustration and with pupil expansion element (FIG. 5b), according to an embodiment;

EXAMPLES OF EMBODIMENTS

FIGS. 1a to 1d show an image projection system according to an embodiment. The image projection system comprises a pin-light array 10 generating a plurality of incident light beams 100a, 100b illuminating an optical light modulator 20 configured for modulating the incident light beams 100a, 100b and projecting a plurality of modulated light-beams 110a, 110b. An optical element 32, 70, 40 is configured to project the plurality of modulated light beams 110a, 110b such as to form pin-light images 31, 39 at a first pin-light plane 30 and project a plurality of projected image light beams 112a, 112b forming second pin-light images 120 (or viewpoints) in a second pin-light plane 124, and defining an eye-box region 121a, 121b along a projection axis 170.

The image projection system is destined to be worn by a viewer for virtual and mixed reality applications. The image projection system can be configured such that, when it is worn by the viewer the eye-box region 121a, 121b and an exit pupil 120 is within the viewer's eye 90. The modulated light beams 110a, 110b are projected towards the pupil 130 of the viewer's eye 90, such that the modulated light beams 110a, 110b are projected on the retina 92.

The optical element can comprise a first pin-light image optical element 70 configured to project the plurality of modulated light beams 110a, 110b such that each of the modulated light beams 110a, 110b forms a pupil image 31, 39 at the first pin-light plane 30 and the modulator image 114a, 114b at a modulator image plane 115.

The optical element can further comprise a second optical element 40 configured to interact with the plurality of modulated light beams 110a, 110b such as to project a plurality of projected image light beams 112a, 112b defining an eye-box region 121a, 121b along a projection axis 170. The second optical element 40 can comprise any one of an eyepiece, a semi-reflective combiner such as curved semi-transparent mirror, a mirror array or a holographic element. The second optical element 40 can comprise a combiner configured for transmitting natural light from the real world 190 towards the eye-box region 121a, 121b such that both projected virtual light-field and natural light are projected, via the combiner 40, within the eye-box region 121a, 121b.

Figure 1A:
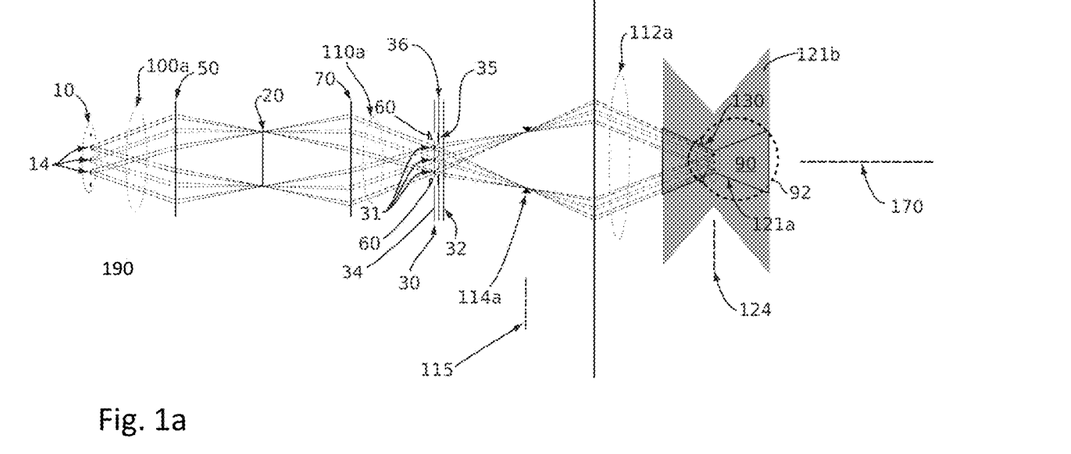
FIGS. 1a to 1d illustrate an image projection system showing foveal incident light beams (FIG. 1a), one (FIG. 1b) or two (FIG. 1c) peripheral incident light beams, and two peripheral incident light beams and one foveal incident light beam (FIG. 1d), according to an embodiment.

In one aspect represented in FIG. 1a, the incident light beams generated by a foveal pin-light subarray 14 of the pin-light array 10 and comprising a plurality of foveal incident light beams 100a. The sub-ensemble of foveal modulated light beams 100a pass through a first optical element 50 and illuminate the optical light modulator 20. The first optical element 50 can comprise a collimating or partly collimating lens, or waveguide with in-coupling element accepting collimated narrow illumination beams and exiting expanded collimated beams through an out-coupling element. The first pin-light image optical element 70 projects the plurality of foveal modulated light beams 110a and form foveal pupil images 31 at a first pin-light plane 30 and, in some embodiments together with optical element 32, foveal modulator image 114a at a modulator image plane 115. The second optical element 40 interacts with the foveal modulated light beams 110a and projects a plurality of projected foveal image light beams 112a, defining a foveal eye-box region 121a along a projection axis 170.

Figure 1B:
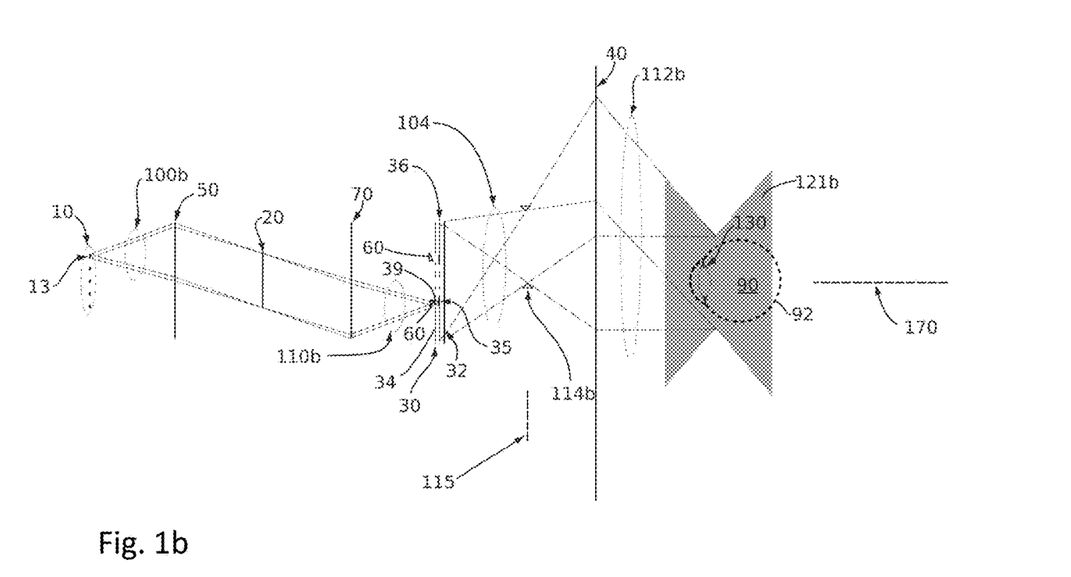
Figure 1C:
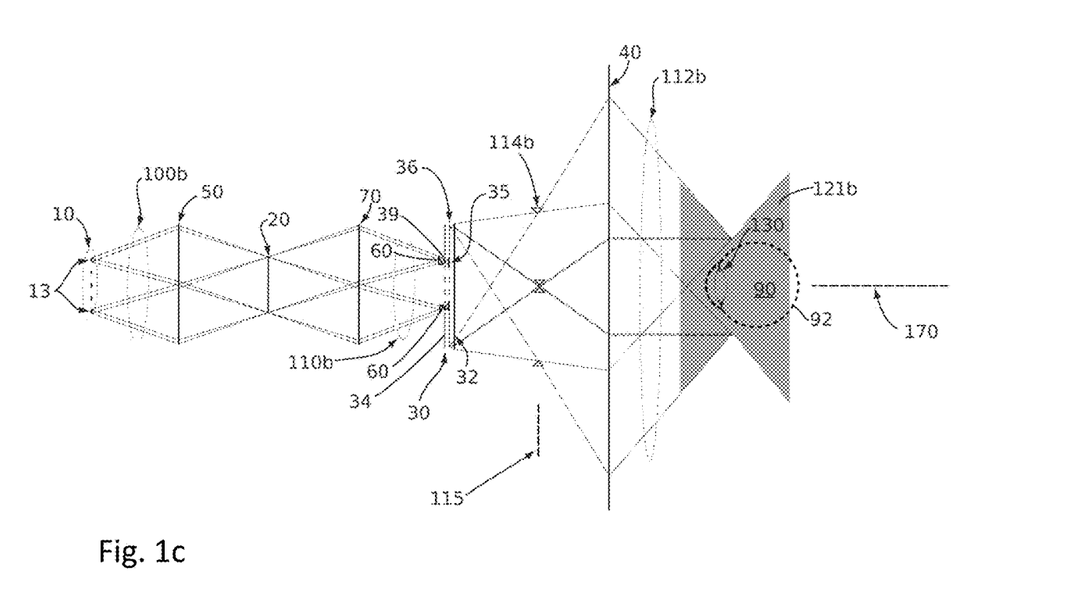

As shown in FIGS. 1b and 1c, the incident light beams generated by the pin-light array 10 further comprises a plurality of peripheral pin-light subarray 13 generating a plurality of peripheral incident light beams 100b (the peripheral pin-lights 13 typically provide higher-intensity illumination light than the foveal pin-lights 14). One peripheral incident light beam 100b is shown in FIG. 1b and two peripheral incident light beams 100b are shown in FIG. 1c. The peripheral incident light beams 100b pass through the first optical element 50 and illuminate the optical light modulator 20 where they are modulated. The first pin-light image optical element 70 projects the plurality of peripheral modulated light beams 110b. The peripheral modulated light beams 110b form peripheral pupil images 39 at the first pin-light plane 30.

The image projection system further comprises a deflecting element 60 at the first pin-light plane 30. The deflecting element 60 is configured to deflect said peripheral modulated light beams 110b with respect to the projection axis 170. The deflecting element 60 is further configured to form shifted peripheral modulator images 114b spatially shifted along the modulator image plane 115.

The deflecting element 60 can comprises a prism or any other deflecting optical element such as an offsetting lens.

The image projection system further comprises an exit pupil expansion device 36. The exit pupil expansion device 36 is configured to replicate the peripheral pupil image 39 (the peripheral pin-light image 39 represents the pupil that is replicated by the exit pupil expansion element 36). For each replicated peripheral pupil image 39, the exit pupil expansion device 36 projects a plurality of pupil expanded light-fields 104. The optical element 32 and the second optical element 40 interact with the pupil expanded light-fields 104 and projects a plurality of projected peripheral image light beams 112b (non-light-field peripheral images), defining a peripheral eye-box region 121b that is wider than the foveal eye-box region 121a.

The image projection system can comprise a Fourier filter 34 located at the first pin light plane 30. The Fourier filter 34 can be configured to remove all but one diffraction component from the modulated light beams 110a, 110b that are reflected and diffracted on the optical light modulator 20.

In an embodiment, the exit pupil expansion device comprises a waveguide 36 extending at the first pin-light plane 30. The waveguide 36 includes an in-coupling element 35 configured to input said peripheral pupil image 39 and an out-coupling element 37 configured to project the plurality of pupil expanded light-fields 104.

Figure 1D:
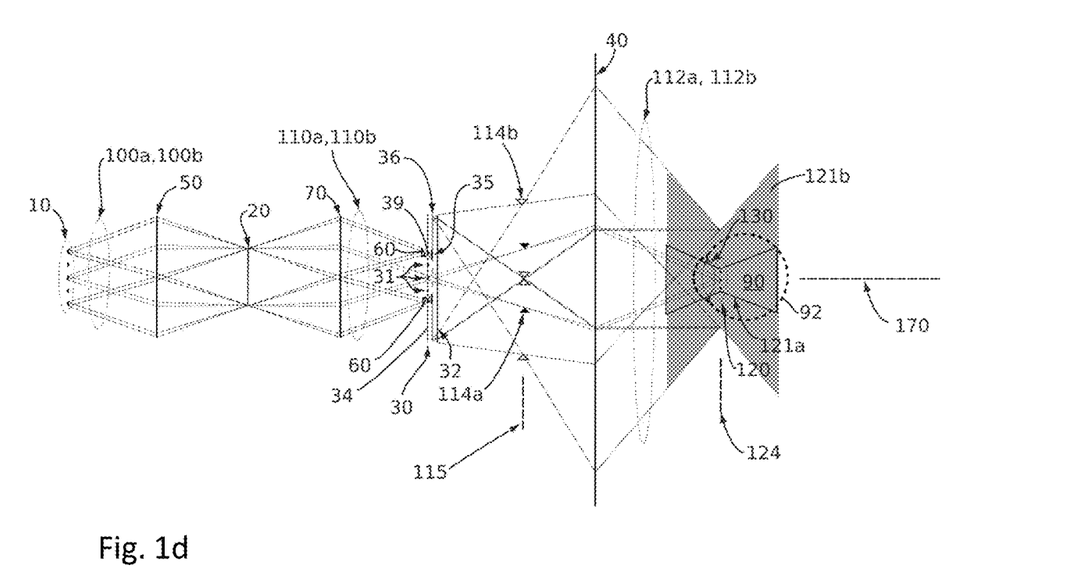

FIG. 1d represent the image projection system including the waveguide 36 at the first pin-light plane 30 showing two peripheral incident light beams 100b and one incident light field beam 100a.

In one aspect, the in-coupling element 35 comprises a diffraction grating. A collimated pixel beams 103 (see FIG. 2a) forming the peripheral pupil image 39 travels within the waveguide 36 by total internal reflection towards the out-coupling element 37. The out-coupling element 37 can comprises another diffraction grating such that the totally internally reflected pupil image 39 is coupled out of the waveguide 36 and replicated such as to project the plurality of pupil expanded light-fields 104.

In another aspect, the in-coupling element 35 and/or the out-coupling element 37 can comprise a holographic optical element. In an alternative aspect not illustrated, the in-coupling element 35 and/or the out-coupling element 37 can comprise a mirror array or a stack of partly transparent mirrors (beam splitters), wherein the collimated pixel beams 103 travels through several mirrors partly reflecting from each mirror interface. In another variant, the in-coupling element 35 and out-coupling element 37 can comprise any one of the diffraction grating, holographic optical element, the mirror array or the stack of partly transparent mirrors or a combination of these elements.

Figure 2A:
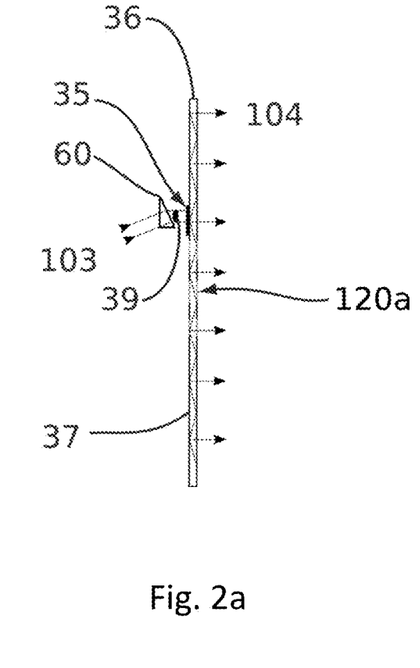
FIGS. 2a and 2b show a side view (FIG. 2a) and a front view (FIG. 2b) of the waveguide, according to an embodiment.
Figure 2B:
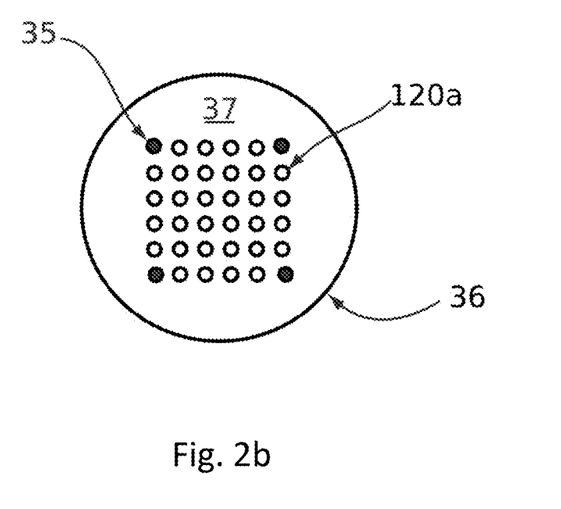

FIG. 2a shows a side view of the waveguide 36, according to an embodiment. In the particular example of FIG. 2a, the deflecting element 60 deflects the peripheral modulated light beams 110b towards the in-coupling element 35 such that peripheral pupil image 39 can be injected in the waveguide 36. FIG. 2b shows a front view of the waveguide 36 comprising four in-coupling elements 35 represented by the dark circles. The out-coupling element 37 occupies substantially the whole surface of the disc-shaped waveguide 36.

The in-coupling element 35 can be configured to collimate an uncollimated peripheral modulated light beams 110b injected in the in-coupling element 35. Such in-coupling element 35 comprises either gradient diffraction grating, spherical mirror or collimating hologram. The injected peripheral modulated light beams 110b carry collimated pixel beams 103 which are guided through the waveguide 36 and gradually exit the waveguide 36 upon interaction with the out-coupling element 37. The peripheral modulated light beams 110b injected through the small peripheral pupil image 39 exit the waveguide 36 through the out-coupling element 37. The out-coupling element 37 can be configured such that the plurality of pupil expanded light-fields 104 exit the waveguide 36 continuously or discretely distributed in the surface of the exit pupil expansion element 36 dependent on the type and configuration of the out-coupling element 37.

Each collimated pixel beam 103 can be emitted from the replicated projection points of the pupil expanded light-fields 104 simultaneously with the same angle (parallel). The pixel thus seemingly shines form infinity and passes through the multiple projection points (or one continuous large area of projection pupil).

In an embodiment, the waveguide 36 can comprise at least one aperture openings 120a configured to transmit the foveal modulated light beams 110 unaffected by the waveguide 36, such that the modulated light beams 110 form foveal modulator images 114a at a modulator image plane 115. In the example of FIG. 2b, the waveguide 36 comprises thirty-two aperture openings 120a represented by the open circles.

In the case the image projection system comprises a Fourier filter 34, the latter may include one or several of the aperture openings 120a. Here, each of the foveal pupil images 31 coincides with an aperture opening 120a provided in the waveguide 36 and, possibly, in the Fourier filter 34.

In another embodiment, the image projection system includes a modulator imaging lens 32 (see FIGS. 1a to 1d) configured to focus the plurality of pupil expanded light beams 104 such as to form the shifted peripheral modulator images 114b.

Figure 3:
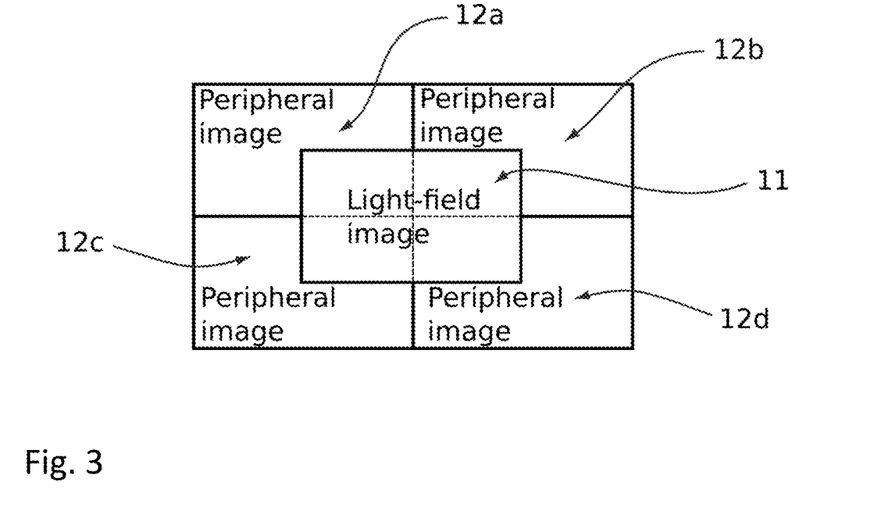
FIG. 3 represents a composed FoV, according to an embodiment.

FIG. 3 represents a composed FoV. The central region 11 contains the foveal modulator images 114a which pass through the aperture openings 120a and form the foveal eye-box region 121a. Each of the four peripheral regions 12a-d contains the (non-light-field) peripheral modulator images 114b and form the peripheral eye-box region 121b.

Figure 4:
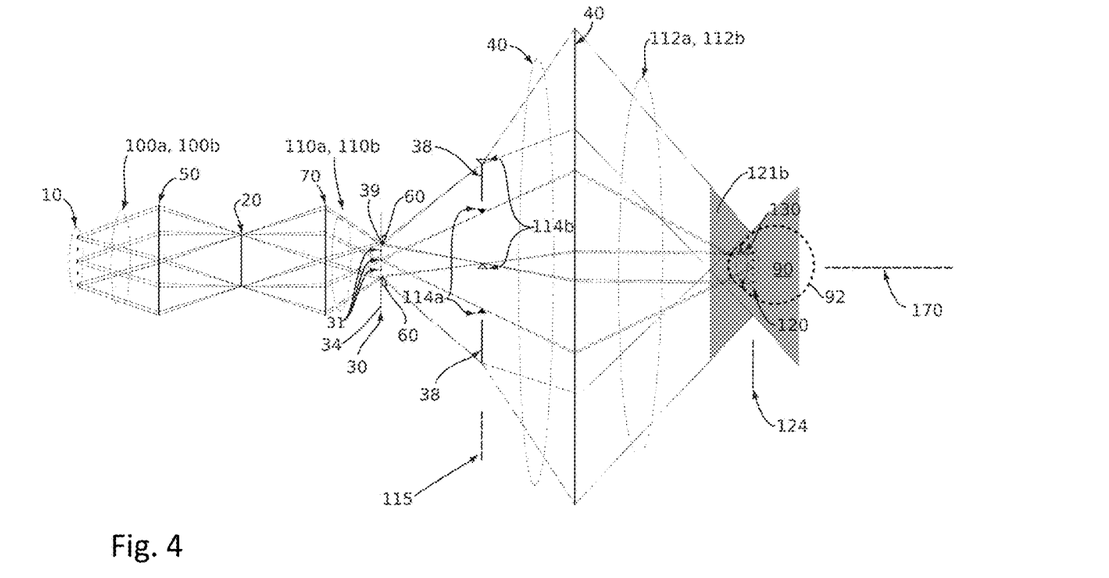
FIG. 4 represents the image projection system, according to another embodiment.

FIG. 4 represent the image projection system, according to another embodiment, wherein the exit pupil expansion device comprises a diffuser element 38 at the modulator image plane 115. In such configuration, the peripheral incident light beams 100b pass through the first optical element 50 and illuminate the optical light modulator 20 where they are modulated. The first pin-light image optical element 70 projects the plurality of peripheral modulated light beams 110b. The peripheral modulated light beams 110b form peripheral pupil images 39 at the first pin-light plane 30. A deflecting element 60 is configured to deflect said peripheral modulated light beams 110b with respect to the projection axis 170 and form shifted peripheral modulator images 114b spatially shifted in the modulator image plane 115. The diffuser element 38 projects a plurality of pupil expanded light-fields 104, expanding the angular emission range of each pixel of the peripheral modulated light beams 110b.

The diffuser element 38 can be transmissive or reflective. The diffuser element 38 can be a fluorescent diffuser in order to prolong image emission in case the illumination time is short or duty cycle small. The diffuser element 38 can be also substituted by an emissive display.

The movement of an eye 90 in the eye socket can cause that the eye pupil 130 exits the foveal eye-box region 121a and the image light does not enter the eye 90 which results in a loss of image information in the FoV that is covered by the foveal image light beams 112a (light-field part of the projected image). This problem can be reduced by temporary filling of this part of FoV by non-light-field image that passes through the peripheral eye-box region 121b and, therefore, is not lost when the eye 90 moves. As a result, the part of the image covering the foveal image light beams 112a is always present. This simple solution requires at least binary eye-tracking information which identifies whether the eye pupil 130 is located inside the light-field part of the eye-box, i.e., the foveal image light beams 112a. Since an eye 90 spends only a small fraction of time outside the foveal eye-box 121a, typically less than 5%, and each time only shortly, the solution is sufficient for most use cases.

Figure 5A:
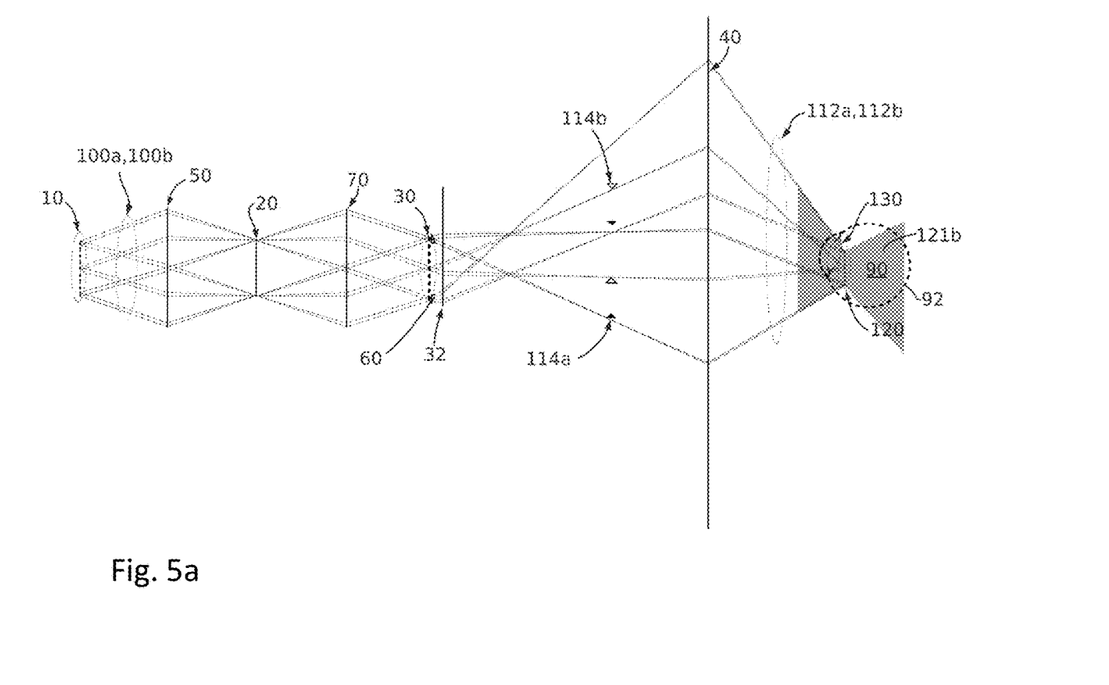

In an embodiment, illustrated in FIG. 5a, the image projection system comprises an eye-tracking and steering device. The eye-tracking and steering device is configured to provide eye-tracking information about where a viewer is looking and to deflect the peripheral projected image light beams 112b in accordance to eye-tracking information.

The eye-tracking and steering device can be further configured to provide the peripheral projected image light beams 112b outside the foveal eye-box region 121 when the eye-tracking information indicates that the viewer is looking outside the foveal eye-box region 121.

More particularly, the eye-tracking and steering device can be configured to estimate a position and direction of gaze of the eye 90, particularly the pupil 130. The eye-tracking and steering device can be further configured to estimate the position and direction of gaze, of the eye 90 and/or the pupil 130 of a user.

In one aspect, the eye-tracking and steering device can comprise a mirror or a lens that is movable in accordance to the eye-tracking information. The eye-tracking information may be provided to a controller (not shown) which controls the movable mirror or lens to adjust the angle of the peripheral projected image light beams 112b.

Figure 5B:
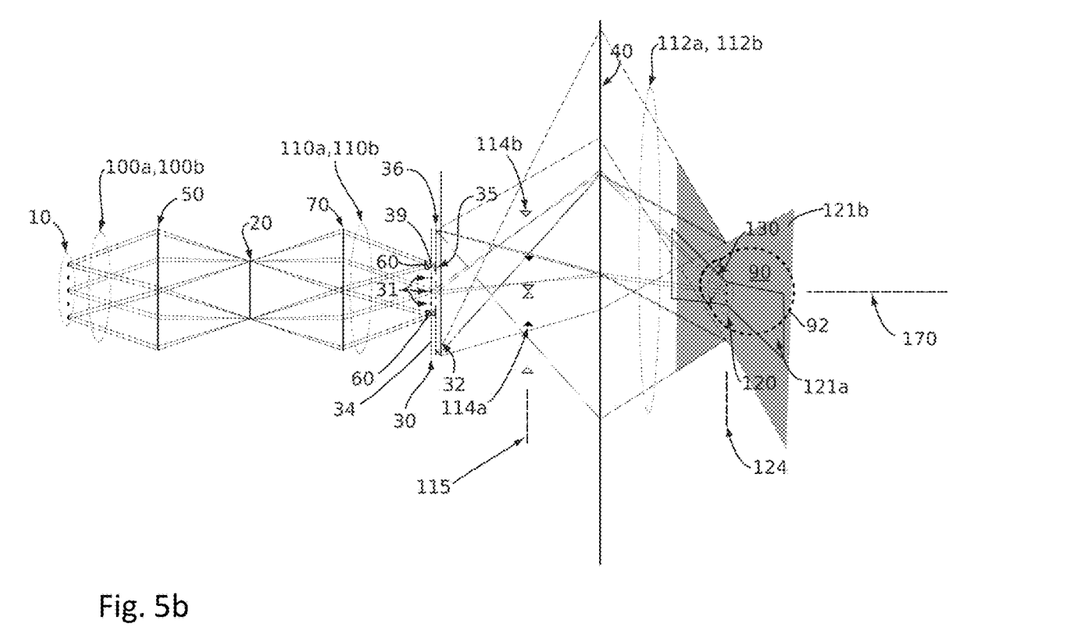

The eye-tracking and steering device can be combined with the image projection system comprising the exit pupil expansion element 36 as illustrated in FIG. 5b.

Figure 6:
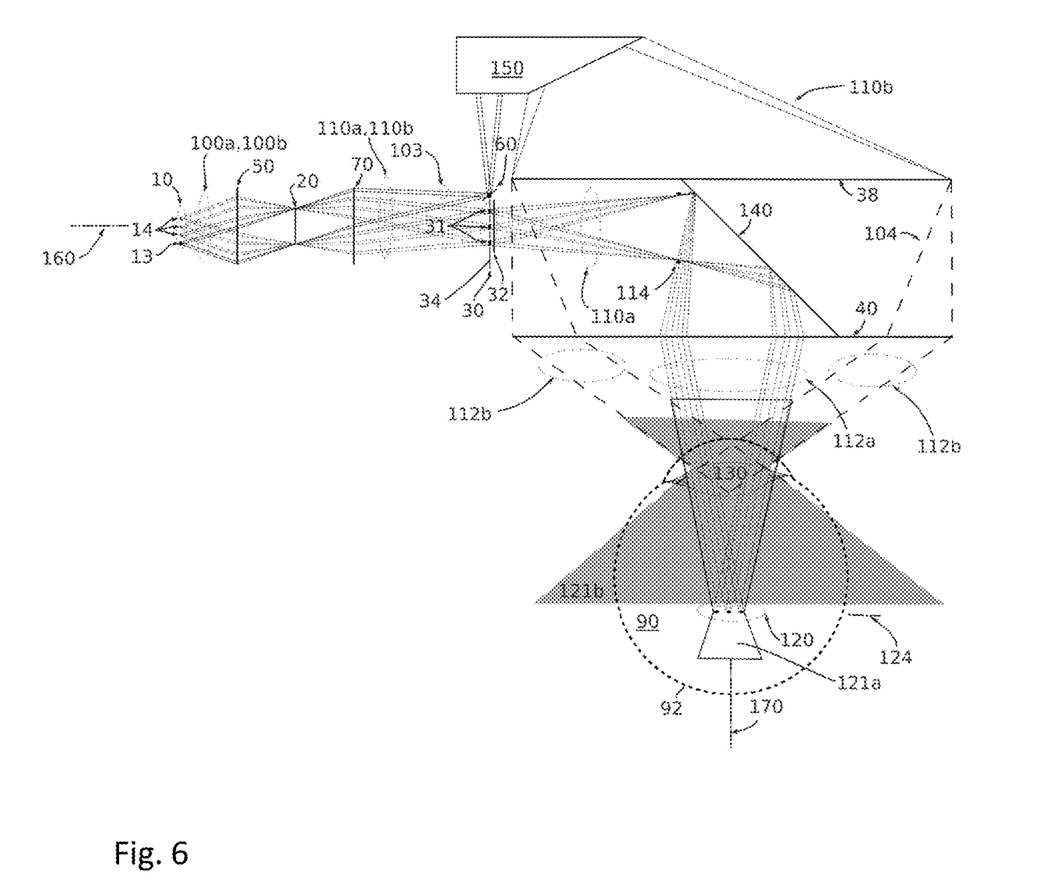
FIG. 6 shows the image projection system with separate light-field foveal and peripheral image projection paths by using mirror deflector, projection optics, diffuser serving as a pupil expansion element and a beam splitter, according to another embodiment.

FIG. 6 shows the image projection system according to another embodiment, where the exit pupil expansion element 36 comprises an off-axis optics 150 located off an incident projection axis 160 parallel to the foveal and peripheral incident light-beam 100a, 100b. The deflecting element 60, a mirror, deflects the peripheral modulated light beams 110b towards the off-axis optics 150 that projects the peripheral modulated light beams 110b on a diffuser element 38 extending substantially parallel to the incident projection axis 160. The diffuser element 38 projects a plurality of pupil expanded light-fields 104 along the projection axis 170, substantially orthogonal to the incident projection axis 160.

The image projection system comprises a beam splitter 140. The foveal modulated light beams 110a pass through aperture openings 120a in the first pin-light plane 30 and reach the beam splitter 140 where they are reflected along the projection axis 170, towards the user's eye 90. The reflected foveal modulated light beams 110a and the pupil expanded light-fields 104 are combined in the second optical element 40 extending substantially parallel to the incident projection axis 160. In this embodiment only one pin-light 13 creating one peripheral image can be used because the optics 150 and diffuser element 38 expand a single peripheral image to a wide FoV.

Figure 7:
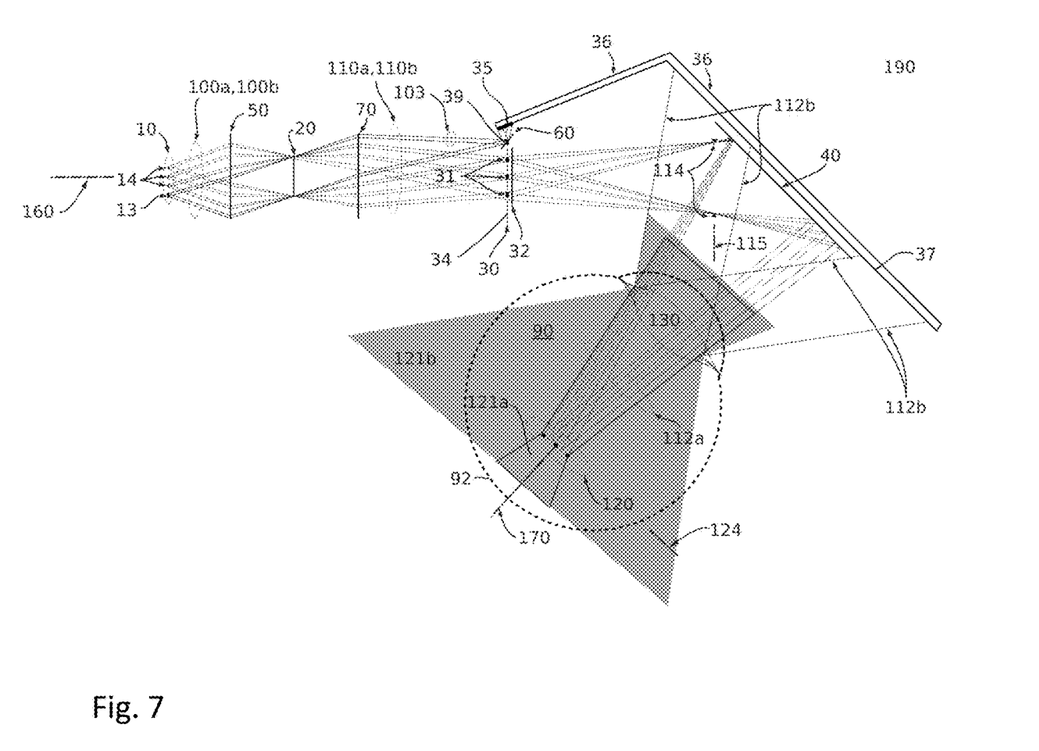
FIG. 7 shows the image projection system with separate light-field foveal and peripheral image projection paths by using mirror deflector and waveguide combiner as a pupil expansion element, according to yet another embodiment.

FIG. 7 shows the image projection system according to yet another embodiment, wherein the exit pupil expansion element 36 comprises a light-guide. The deflecting element 60, a mirror, deflects a single peripheral modulated light beam 110b towards a light-guide in-coupling element 35. The light-guide 36 guides the single peripheral modulated light beam 110b and projects the pupil expanded light-fields 104 from an out-coupling element 37 provided in the light-guide 36. The pupil expanded light-fields 104 are projected along the projection axis 170. The projection axis 170 can make an angle relative to the incident projection axis 160 between 30° and 120°.

The foveal modulated light beams 110a pass through aperture openings 120a in the first pin-light plane 30 and reach the second optical element 40, extending substantially parallel to the out-coupling element 37. The foveal modulated light beams 110a are reflected on the second optical element 40 along the projection axis 170. The foveal modulated light beams 110a are combined with the pupil expanded light-fields 104 and reach the user's eye 90.

REFERENCE NUMBERS AND SYMBOLS 10 pin-light array
11 central region
12a, 12b, 12c, 12d peripheral region
13 peripheral pin-light subarray
14 foveal pin-light subarray
20 optical light modulator
30 first pin-light plane
31 foveal pupil image
32 modulator imaging lens
34 Fourier filter
35 in-coupling element
36 exit pupil expansion device
37 out-coupling element
38 diffuser
39 peripheral pupil image
40 second optical element
50 first optical element
60 deflecting element
70 first pin-light image optical element
90 eye
92 retina
100a foveal incident light-beam
100b peripheral incident light beam
104 pupil expanded light beam
110a foveal modulated light beam
110b peripheral modulated light beam
112a foveal image light beams
112b peripheral image light beams
114a foveal modulator image
114b peripheral modulator image
115 modulator image plane
120 second pin-light images, viewpoints
120a aperture opening
121a projected foveal eye-box region
121b projected peripheral eye-box region
124 second pin-light plane
130 pupil
140 beam splitter/semi-transparent mirror
150 image projection optics
160 incident projection axis
170 projection axis
190 real world

The invention claimed is:

1. A near-eye image projection system, comprising:
a pin-light array generating a plurality of incident light beams illuminating an optical light modulator configured for modulating the incident light beams and projecting a plurality of modulated light-beams;
an optical element configured to project the plurality of modulated light beams such as to form pin-light images at a first pin-light plane and project a plurality of projected image light beams defining an eye-box region along a projection axis;
wherein said plurality of modulated light beams comprises a plurality of foveal modulated light beams forming foveal pupil images and projecting a plurality of foveal projected image light beams defining a foveal eye-box region;
wherein said plurality of modulated light beams further comprises a plurality of peripheral modulated light fields forming peripheral pupil images;
the system further comprising an exit pupil expansion device configured to project a plurality of pupil expanded light beams for each of the peripheral pin-light images, said plurality of pupil expanded light beams forming peripheral projected image light beams defining a peripheral eye-box region wider than the foveal eye-box region;
wherein the expansion device is configured to transmit the foveal modulated light beams unaffected by the expansion device, such that the foveal modulated light beams form foveal modulator images at a modulator image plane;
wherein the optical element comprises a first pin-light image optical element configured to project the plurality of foveal modulated light beams such as to form foveal modulator images at the modulator image plane; and
wherein the image projection system further comprises, at the first pin-light plane, a deflecting element configured to deflect said peripheral modulated light beams with respect to the projection axis and form shifted modulator images spatially shifted along the modulator image plane.

2. The image projection system according to claim 1, wherein the exit pupil expansion device further comprises a diffuser element at the modulator image plane.

3. The image projection system according to claim 1, wherein the expansion device comprises a waveguide extending in the first pin-light plane, the waveguide comprising an in-coupling element configured to input said peripheral pin-light image, and an out-coupling element configured to project said plurality of pupil expanded light beams.

4. The image projection system according to claim 3, wherein the out-coupling element is configured to project a plurality of discrete pupil expanded light beams.

5. The image projection system according to claim 3, wherein the out-coupling element is configured to project continuously distributed pupil expanded light beams.

6. The image projection system according to claim 3, further comprising a beam focusing element configured to focus the plurality of pupil expanded light beams such as to form the shifted modulator images.

7. The image projection system according to claim 6, wherein the in-coupling element is configured to collimate the peripheral modulated light beams.

8. The image projection system according to claim 3, wherein at least one of the in-coupling element or out-coupling element comprises a holographic optical element.

9. The image projection system according to claim 3, wherein at least one of the in-coupling element or out-coupling element comprises a mirror array or a stack of partly transparent mirrors.

10. The image projection system according to claim 3, wherein at least one of the in-coupling element or out-coupling element comprises a diffraction grating.

11. The image projection system according to claim 3, wherein the aperture openings are provided in the waveguide, each aperture opening being configured to transmit the pin-light image.

12. The image projection system according to claim 1, wherein the deflecting element comprises a prism.

13. The image projection system according to claim 1, comprising a second optical element configured to interact with the plurality of modulated light beams such as to project a plurality of projected image light beams defining an eye-box region along a projection axis.

14. The image projection system according to claim 13, wherein the second optical element comprises a combiner configured to transmit natural light from the real world towards the eye-box region.

15. The image projection system according to claim 1 wherein the exit pupil expansion element comprises an off-axis optics and a diffuser element, the off-axis optics being configured to project the peripheral modulated light beams on the diffuser element, the diffuser element projecting the pupil expanded light beams along the projection axis, substantially orthogonal to an incident projection axis parallel to the foveal and peripheral incident light-beam; and wherein the image projection system comprises a beam splitter reflecting the foveal modulated light beams along the projection axis, the reflected foveal modulated light beams being combined to the pupil expanded light beams in the optical element.

16. The image projection system according to claim 1 wherein the exit pupil expansion element comprises a light-guide configured to guide a peripheral modulated light beam and projects the pupil expanded light beams from an out-coupling element provided in the light-guide along the projection axis making an angle relative to an incident projection axis parallel to the foveal and peripheral incident light-beam; and wherein the foveal modulated light beams are reflected on the second optical element along the projection axis.

17. The image projection system according to claim 1, comprising an eye-tracking and steering device configured to provide eye-tracking information about where a viewer is looking; and wherein the eye-tracking and steering device is configured to deflect the peripheral projected image light beams in accordance to eye-tracking information.

18. The image projection system according to claim 17, wherein the eye-tracking and steering device comprises a mirror or lens movable in accordance to eye-tracking information.

19. The image projection system according to claim 18, wherein the eye-tracking and steering device is configured to provide non-light-field images outside the first eye-box region when the eye-tracking information indicates that the viewer is looking outside the first eye-box region.

* * * * *